(12) United States Patent
Anderson et al.

(10) Patent No.: US 6,571,246 B1
(45) Date of Patent: May 27, 2003

(54) AUTOMATIC DATA COLLECTION AND WORKFLOW MANAGEMENT IN A BUSINESS PROCESS

(75) Inventors: Eric C. Anderson, San Jose, CA (US); Devin Mitsugi Jaya Fernandez, San Jose, CA (US)

(73) Assignee: IPAC Acquisition Subsidiary I, LLC, Peterborough, NH (US)

( * ) Notice: Subject to any disclaimer, the term of this patent is extended or adjusted under 35 U.S.C. 154(b) by 0 days.

(21) Appl. No.: 09/532,710

(22) Filed: Mar. 22, 2000

(51) Int. Cl.[7] ............................. G06F 17/30; G06F 7/00
(52) U.S. Cl. ................................. 707/10; 707/1; 707/6
(58) Field of Search .................... 707/1–10, 100–104.1

(56) References Cited

U.S. PATENT DOCUMENTS

| | | | | |
|---|---|---|---|---|
| 5,675,784 A | * | 10/1997 | Maxwell et al. | 345/803 |
| 5,867,824 A | * | 2/1999 | Saito et al. | 705/9 |
| 5,930,512 A | * | 7/1999 | Boden et al. | 717/102 |
| 5,950,173 A | * | 9/1999 | Perkowski | 235/375 |
| 5,987,459 A | * | 11/1999 | Swanson et al. | 707/6 |
| 6,006,039 A | | 12/1999 | Steinberg et al. | 396/57 |
| 6,032,124 A | * | 2/2000 | Saito et al. | 705/8 |
| 6,147,742 A | * | 11/2000 | Bell et al. | 355/27 |
| 6,181,336 B1 | * | 1/2001 | Chiu et al. | 345/736 |
| 6,272,484 B1 | * | 8/2001 | Martin et al. | 707/1 |
| 6,366,910 B1 | * | 4/2002 | Rajaraman et al. | 707/5 |
| 6,442,563 B1 | * | 8/2002 | Bacon et al. | 705/8 |

* cited by examiner

*Primary Examiner*—Greta Robinson
*Assistant Examiner*—Linh Black
(74) *Attorney, Agent, or Firm*—Sawyer Law Group LLP

(57) ABSTRACT

A method and system for data collection and workflow management in a business process using the Internet includes: defining a plurality of steps of a business process on a network; and automatically implementing the plurality of steps, including sending a request for data, receiving the data with tags, where the tags comprise identifying information concerning the data, and storing the data based on the tags. The method and system include the ability to integrate a digital image capture device into the business process, where the web server creates an executable file which is downloadable into the digital image capture device. The executable file creates tags for the digital images captured by the digital image capture device. The web server uses these tags to match an image to corresponding stored data. In this manner, there is less chance of confusion or mistake, and the speed of performance is also increased.

15 Claims, 5 Drawing Sheets

AUTOMATIC DATA COLLECTION AND WORKFLOW MANAGEMENT IN A BUSINESS PROCESS

FIELD OF THE INVENTION

The present invention relates to management of a business process, and more particularly to management of a business process using a network.

BACKGROUND OF THE INVENTION

Every business has a process with which the business's product and/or service is provided to customers. The business process determines the manner of data collection and manages the workflow. For example, a business process for a real estate brokerage may begin with a request by a home owner to list his/her house for sale. The real estate broker then creates a form on a computer, fills it out with information concerning the property, and leaves a spot for a photograph of the property. The real estate broker then instructs a photographer to obtain a photograph of the property. The photographer goes to the property, takes a photo, develops the film, and gives it to the broker. The broker pastes the picture onto the form. In the alternative, the photographer captures a digital image of the property with a digital camera and uploads the image to the broker's computer. The broker pastes the image onto the form in the computer. The form is then photocopied to create flyers. For the flyers to be available on the Internet, the data and image are manually transferred to a web page.

However, this business process requires many of its steps to be performed manually. The real estate broker must manually instruct the photographer to take the photograph and which property to photograph. Once the photographer gives the photo to the broker, the broker must manually match the photo to the correct form. At each manual step, there is a chance for confusion, mistake, and slowdown in performance. The broker may forget to contact the photographer, may forget to follow up with the photographer if the broker does not receive the photo, or may mismatch the photo with the wrong form.

Accordingly, there exists a need for an improved method and system for data collection and workflow management in a business process. The improved method and system should use the Internet to automate the business process to decrease the chance for confusion and mistake and improve performance. The present invention addresses such a need.

SUMMARY OF THE INVENTION

The present invention provides a method and system for data collection and workflow management in a business process using a network. The method includes: accessing a web server; defining a plurality of steps of a business process on the web server; and automatically implementing the plurality of steps. The plurality of steps includes: sending a request for data, receiving the data with tags, where the tags comprise identifying information concerning the data, and storing the data based on the tags. The present invention allows a business process to be created on a web server via the Internet, where the business process is then automatically implemented by the web server. The business process is stored in a database. The web server manages the data collection and workflow using the information stored in the database. The present invention includes the ability to integrate a digital image capture device into the business process, where the web server creates an executable file which is downloadable into the digital image capture device. The executable file creates tags for the digital images captured by the digital image capture device. The tags contain identifying information. The web server uses these tags to match an image to any corresponding data stored in the database. In this manner, there is less chance of confusion or mistake, and the speed of performance is also increased.

DETAILED DESCRIPTION

The present invention provides an improved method and system for data collection and workflow management in a business process. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention provides a method and system for defining a business process on a network, where the business process is then automatically implemented by the network. The business process is stored in a database. The web server manages the data collection and workflow using the information stored in the database. The present invention includes the ability to integrate a digital image capture device into the business process, where the web server creates an executable file which is downloadable into the digital image capture device. The executable file creates tags for the digital images captured by the digital image capture device. The tags contain identifying information. The web server uses these tags to match an image to any corresponding data stored in the database.

To more particularly describe the features of the present invention, please refer to FIGS. 1 through 5 in conjunction with the discussion below.

Figure 1:
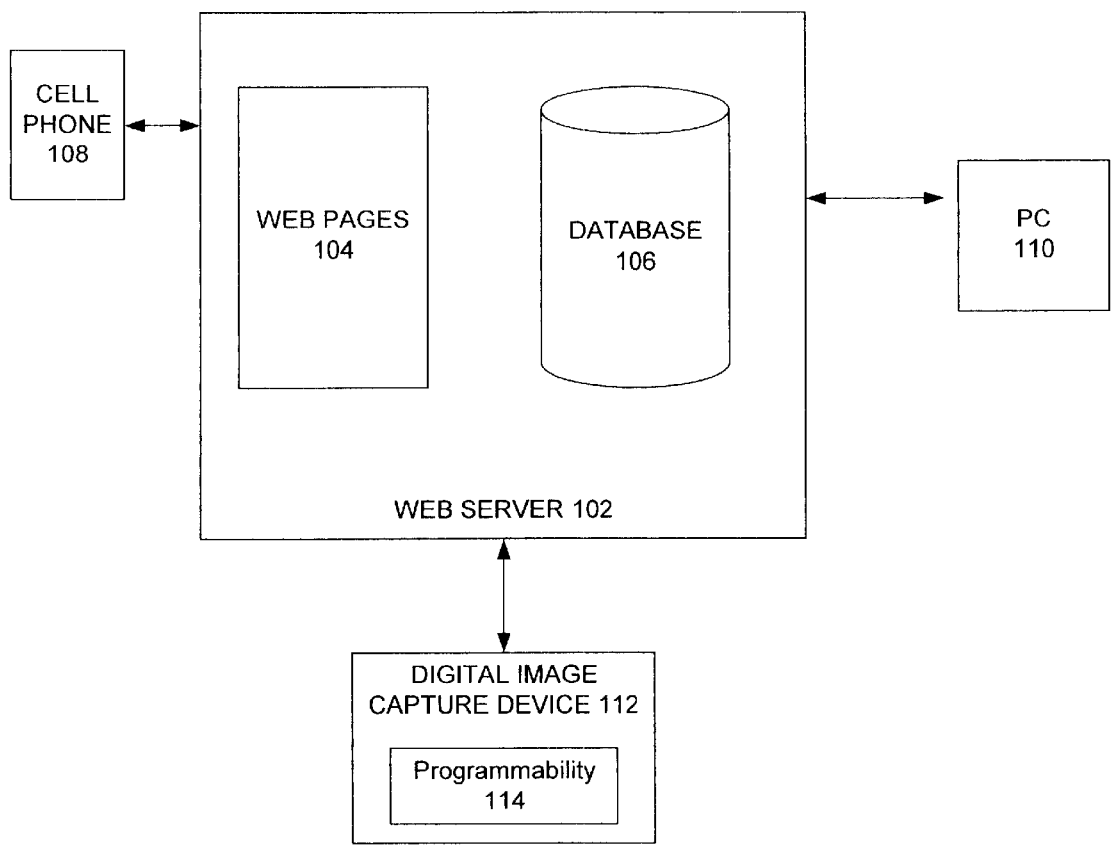
FIG. 1 illustrates a preferred embodiment of a system for data collection and workflow management in a business process in accordance with the present invention.

FIG. 1 illustrates a preferred embodiment of a system for data collection and workflow management in a business process in accordance with the present invention. The system 100 includes a web server 102 which comprises web pages 104 and a database 106. Using a personal computer (PC) 110, a business can access the web server 102 via one of its web pages 104 and define the steps for a business process. A business process are steps with which a business provides its products and/or services. The business process is stored in the database 106. The web server 102 then automatically implements the business process. Part of the implementation could include sending requests for data to external devices, such as a cellular phone 108 or a PC 110 via an email. The request could include an executable file which is downloadable to a digital image capture device 112. The digital image capture device 112 contains a programmability component 114 which allows it to run the executable file. In the preferred embodiment, the executable file could be a script, an application, an applet, or a data file. The executable file includes instructions concerning the subject matter of the images to be captured. When the images are captured, the executable file creates tags for the images. The tags contain identifying information concerning the image. The identifying information could include the business's name, customer number, order number, workgroup ID, specifications, descriptions, names addresses, locations, colors, time, date of specific events, etc.—anything which is relevant to the business process. The images are then uploaded to the web server 102, and the information in the tags is used by the web server 102 to match each image to its corresponding data stored in the database 106. The data in the database 106 and the images may then be used in subsequent business process steps, such as creating web pages.

Figure 2:
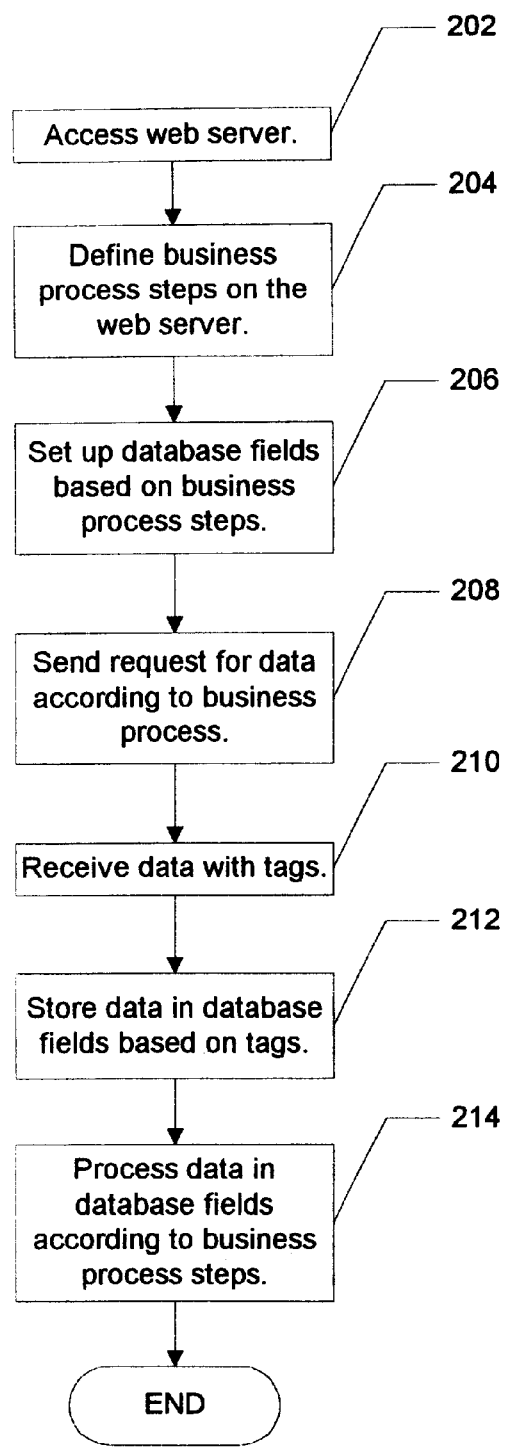
FIG. 2 is a flowchart illustrating the preferred embodiment of a method for data collection and workflow management in a business process in accordance with the present invention.

FIG. 2 is a flowchart illustrating the preferred embodiment of a method for data collection and workflow management in a business process in accordance with the present invention. First, a business accesses the web server 102, via step 202, typically through a web page 104. The business then defines the steps of its business process on the web server 102, via step 204. In the preferred embodiment, forms are provided on web pages 104 to assist the business in defining its business process. For example, a business fills in a form with its name and customer number. The form may provide a set of predefined process steps from which the business may choose., When a step is chosen, another form is provided for the business to provide detailed information needed to implement the step, or to customize the step to its particular needs.

Fields, and/or records, in the database 106 are then set up by the web server 102 based on the business process steps, via step 206. Process initiation is typically done by a business employee filling out a web page form. When data is required according to the business process, a request for the data is sent to the appropriate party, via step 208. The party then performs whatever tasks are required to obtain the data and uploads it to the web server 102. Possible data formats include numerical, textual, photographic, or audio. Numerical and text data may be obtained via a web page form. Audio data may be obtained as an attachment to an email or from an interactive web page. Photographic images may be obtained from the digital image capture device 112. Particularly for photographic data, tags containing identifying information are created for the data. The data can be uploaded via a wireless connection such as via a cell phone 108, via modem from a PC 110, or via connection with a digital image capture device 112. The web server 102 receives the data with its tags, via step 210. The web server 102 then stores the data in the database fields based on the identifying information in the tags, via step 212. This data stored in the database fields is then processed according to the business process steps, via step 214. This may include forwarding a formatted data package to a remote data or web server.

Figure 3:
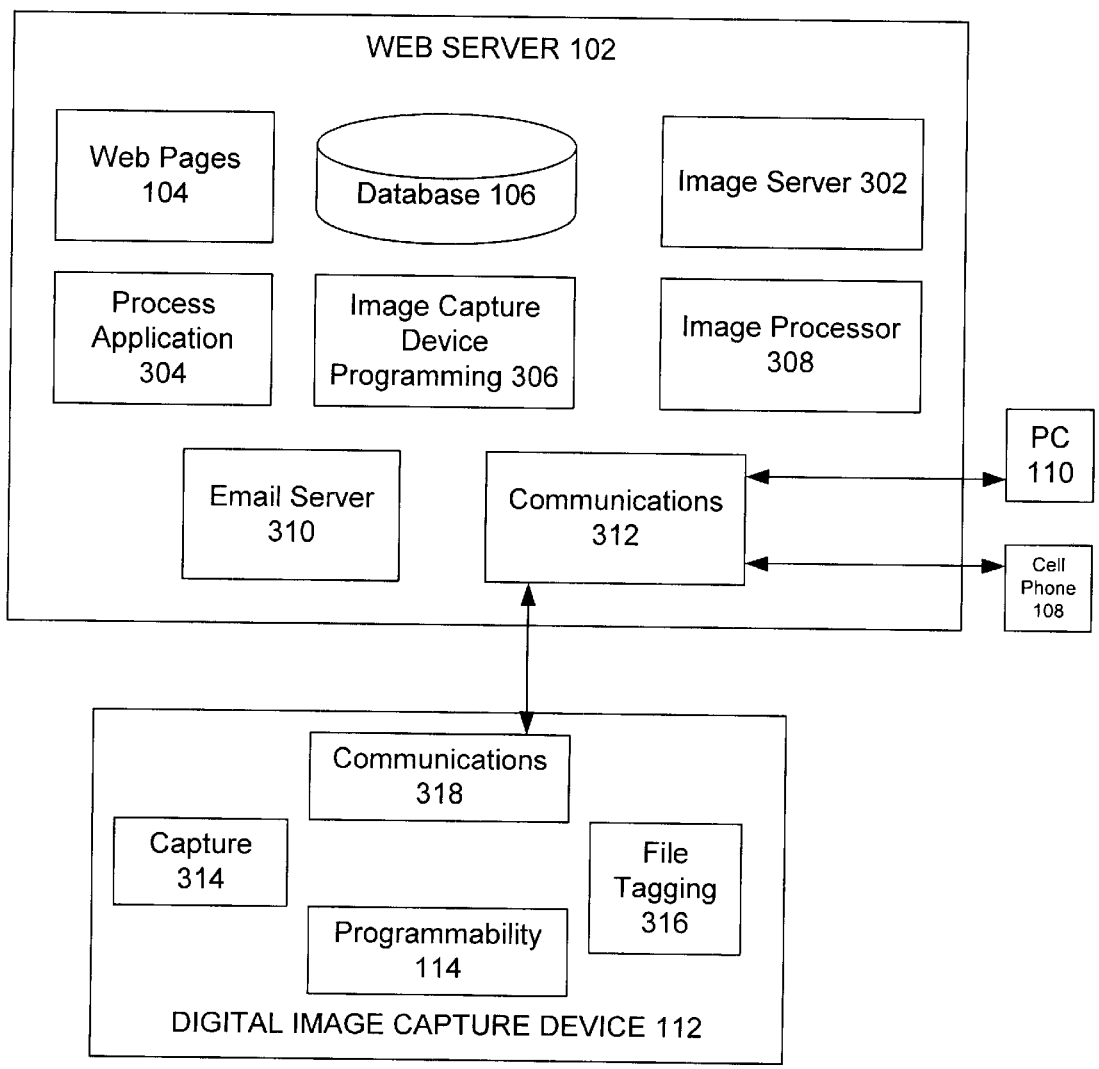
FIG. 3 illustrates the preferred embodiment of the system in accordance with the present invention with a digital image capture device integrated into the business process.

An important feature of the present invention is the ability to integrate a digital image capture device 112 into the business process. FIG. 3 illustrates the preferred embodiment of the system in accordance with the present invention with a digital image capture device integrated into the business process. In addition to the web pages 104 and the database 106, the web server 102 comprises:

- an image server 302, which stores and maintains digital images;
- a process application 304, which interfaces with the database 106 and directs the implementation of the business process steps;
- an image capture device programming component 306, which creates the executable file downloadable to the digital image capture device 112, as directed by the process application 304;
- an image processor 308, which sizes, scales, crops, etc. a digital image, as directed by the process application 304;
- an email server 310, which sends emails to appropriate parties, as directed by the process application 304; and
- a communications component 312, through which external devices may communicate with the web server 102.

In addition to the programmability component 114, the digital image capture device 112 comprises:

- a capture component 314, which captures the digital images;
- a file tagging component 316, which creates tags containing identifying information for a digital image file, as directed by the executable file; and
- a communications component 318, through which the digital image capture device 112 can communication with other devices.

Figure 4:
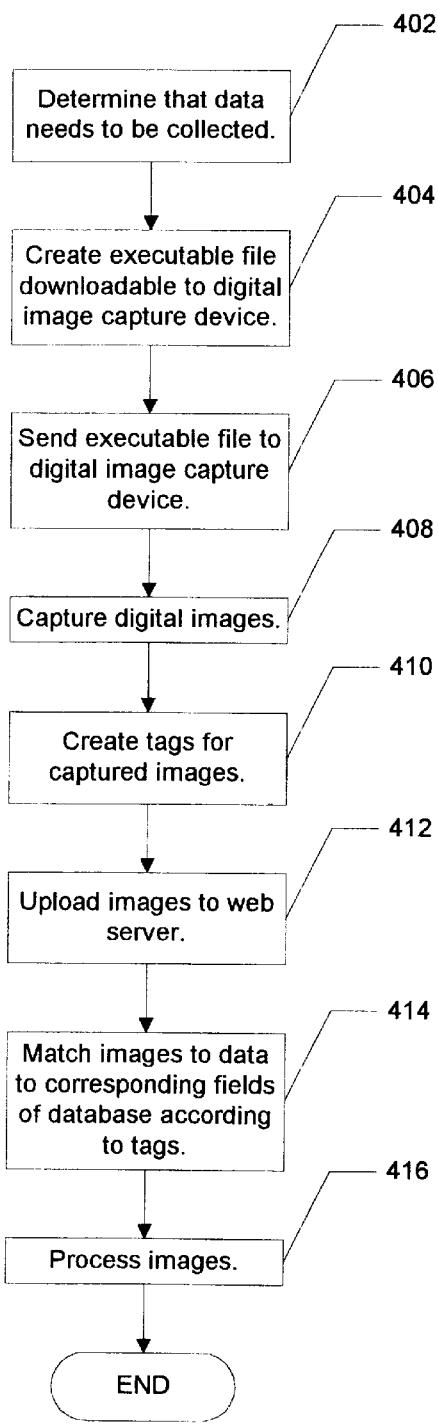
FIG. 4 is a flowchart illustrating the preferred embodiment of the method in accordance with the present invention with a digital image capture device integrated into the business process.

FIG. 4 is a flowchart illustrating the preferred embodiment of the method in accordance with the present invention with a digital image capture device integrated into the business process. After the business process steps have been defined and the database fields set up, via steps 204 and 206 (FIG. 2), the process application 304 determines that data needs to be collected to implement the business process steps, via step 402. In the preferred embodiment, the process application 304 either interfaces with the database 106, or it receives a message from another component, such as a web page form filled out by a business employee in response to an email or cell phone call sent earlier by the server 102, that data needs to be collected. Assume that the data to be collected includes a group of digital images, as well as other textual, numeric, or audio data. The process application 304 then directs the image capture device programming component 306 to create an executable file downloadable to the digital image capture device 112, via step 404. The executable file would include instructions concerning the subject matter of the images to be captured and identifying information for the images. The executable file is then sent to the digital image capture device 112, via step 406. This may be accomplished in many different ways. For example, the process application 304 could send an email to the photographer via the email server 310 with the executable file as an attachment. Alternatively, the email could contain a link to a web page 104, from which the photographer may download the executable file, either directly to the digital image capture device 112 or through a PC 110. Alternatively, the executable file may be sent directly to the digital image capture device 112 via a wireless connection. The photographer then interacts with the digital image capture device 112 to capture the images using the capture component 314, via step 408, with the aid of information provided by the executable file. The file tagging component 316 of the device 112 creates tags for the images as directed by the executable file, via step 410. The images are then uploaded from the digital image capture device 112 to the web server 102, via step 412. Step 412 could be done automatically via a wireless connection, via modem, or via use of a PC 110. The images are stored by the image server 302. Each image is matched to data in a corresponding field of the database 106 according to the identifying information in the tags, via step 414. The images are then processed by the image processor 308 as directed by the process application 304, via step 416. Web pages may then be created using the data in the database and the corresponding images. Formatted data packages containing the images and other information collected by the business process can be delivered to a remote database or web server, if required.

For example, assume that a real estate brokerage firm is using the method and system in accordance with the present invention. First, a broker accesses the web server 102, via step 202. The broker defines the firm's business process using the web pages 104, via step 204. For example, a web page 104 may contain a form with which the firm's name, customer number, and area of business are provided. Once the area of business is selected, another web page 104 is displayed which contains a list of predefined business process steps for the real estate brokerage business. When a step is selected, another web page 104 is displayed with a form with fields pertaining to the details needed to perform that step. The broker can select other appropriate steps for his or her firm, order the steps, and customize them.

Figure 5:
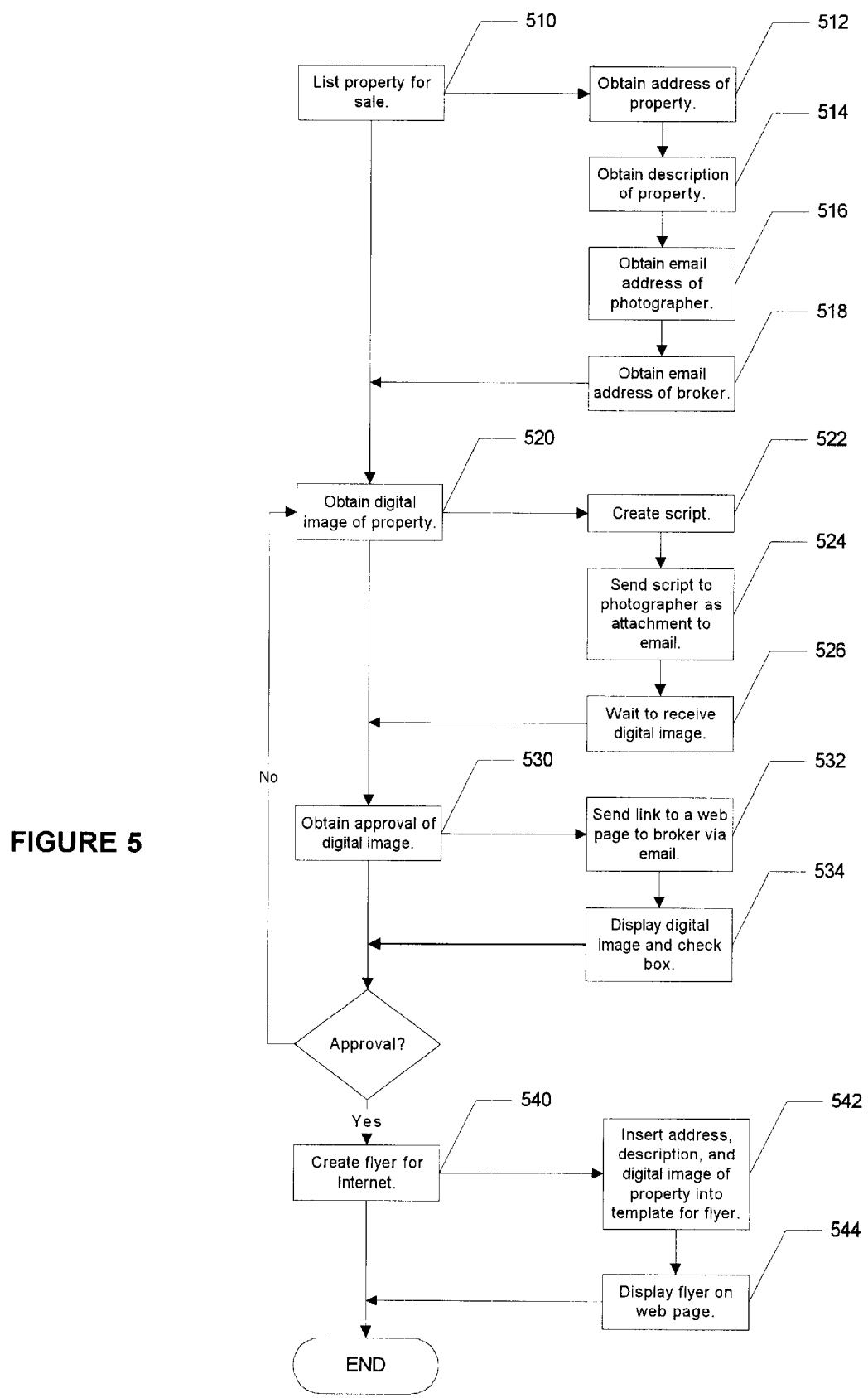
FIG. 5 is a flowchart illustrating an example business process creating in accordance with the present invention.

Assume that the business process for the firm has been defined with the steps illustrated in the flowchart in FIG. 5. The first business process step is to list a property for sale, via step 510. Then a digital image of the property is obtained, via step 520. Next, approval of the digital image is obtained, via step 530. If approval is not given, then the business process returns to step 520. If approval is given, then a flyer for the property is created for the Internet, via step 540.

Sub-steps for implementing the list step 510 are defined as: obtaining the address of the property to be listed, via step 512; obtaining a description of the property, via step 514; obtaining the email address of the photographer who will take the digital image of the property, via step 516; and obtaining the email address of the broker who will be the contact, via step 518.

Sub-steps for implementing the obtaining step 520 are defined as: creating a script for the digital image capture device, via step 522; sending the script to the photographer as an attachment to an email, via step 524; and then waiting to receive the digital image, via step 526.

Sub-steps for implementing the obtaining step 530 are defined as: sending a link to a web page to the broker via an email, via step 532; and displaying the digital image and a check box to indicate approval of the digital image on the web page, via step 534.

Sub-steps for implementing the creating step 540 are defined as: inserting the address description, and the digital image of the property into a template for the flyer, via step 542; and displaying the flyer on a web page, via step 544.

Possible fields in the database 106 for this business process include the firm's name, the firm's customer number, the address of the property, the description of the property, the email address for the photographer, the script, the file name for the digital image, the email address of the broker, whether or not the digital image has been approved, and a template web page for the flyer.

Once the business process steps 510–544 are defined, they may be implemented. The implementation is initiated by the broker accessing the web server 102 when a property is available for sale. The broker logs in with the firm's name and customer number. The process application 304 automatically interfaces with the database 106, examines the fields for the firm's business process, and determines that certain data needs to be collected, via step 402 (FIG. 4). The process application 304 then directs that a web page with a form for listing a property for sale be displayed, implementing step 510. The broker enters the data requested on the form, including the address and description of the property, the email addresses of the photographer, and his/her own email address. The broker submits this information, implementing steps 512–518. Step 510 is implemented for each property the broker wishes to list.

The process application 304 then automatically implements step 520 of the business process, directing the image capture device programming component 306 to create a script for the digital image capture device, via step 404, which implements step 522 of the business process. The script may pertain to all of the properties the broker wishes to list. The process application 304 also directs the email server 310 to send the photographer an email with the script as an attachment, implementing step 524. The process application 304 then waits to receive the digital images, implementing step 526. Optionally, if the process application 304 does not receive the digital images within a period of time determined by the broker, then the process application 304 directs the email server 310 to send a notification to the broker. The broker may then take steps of remind the photographer of the pending request for the digital images.

The photographer downloads the script into the digital image capture device 112, via step 406. The script may be downloaded via a modem, a PC 110, or directly via a wireless connection. Assume in this example that the digital image capture device 112 is a digital camera with the Digita™ Operating Environment by FlashPoint Technology of San Jose, Calif. Digita™ provides the programmability component 114. The camera 112 then runs the script, so that when the photographer interfaces with the camera 112, a list of the properties for which images have been requested is displayed. The photographer then travels to the location of each of the properties. When the photographer is ready to take an image of a property, he or she uses the digital camera user interface to select the appropriate property from the list, and then captures its image, via step 408. After the image is captured, the file tagging component 316 of the digital camera 112 creates the tags, via step 410, which contain the firm's customer number, the property address, and any other identifying information. The tags may be inserted into the image itself, or be created in a separate file. These steps for capturing the image are performed for each property on the list. Once the digital images have been captured, the photographer uploads them and its tags to the web server 102, via step 412. For example, the photographer may remove a flash memory card from the digital camera 112 and inert it into a PC 110. The PC 110 then connects with the web server 102 via a modem. Alternatively, a direct wireless connection between the digital camera 112 and the web server 102 can be utilized for instant uploads.

The images are stored in the image server 302. Once the images have been received, the process application 304 automatically implements step 530 of the business process. It directs the email server 310 to send an email to the broker with a link to a web page, implementing step 532. When the broker selects the link, a web page 104 is displayed with the images, along with a check box for each image for indicating approval, implementing step 534. The broker submits the approval or disapproval to the web server 102 by clicking on a submit button.

For images which are not approved, the process application 304 re-implements step 520. For the approved images, the process application 304 creates the flyer for the Internet, implementing step 540 of the business process. To implement this step, the process application 304 interfaces with the database 106, and matches the information extracted from the tags with the corresponding fields in the database 106, via step 414. The image approval fields for these images are changed to indicate approval, and the image file name is stored in the proper fields. For each property, the process application 304 copies the address, description and image of the property from the database fields into the template for the flyer, implementing step 542. In doing so, the process application 304 may direct the image processor 308 to process the images, via step 416, by scaling, cropping, merging with other graphics, etc. Once processed, the process application 304 provides the flyers as web pages, implementing step 544, so that they may be accessed via the Internet. This process would be dynamic, i.e., the web page would be created on request. This may be facilitated on a separate and remote web server, where a formatted data package is sent by the process web server 102 to the remote database or web server, including all required information and the processed digital images.

In this manner, the business process of the firm is automatically implemented once the broker defines the business process steps and initiates them. The web server 102 performs many of the steps which are conventionally performed manually, such as emailing the photographer, collecting the digital images, matching the digital images with the property, and creating the flyers or web pages or automatically populating a remote web or database server with the data. The printing of the flyers may also be performed automatically, rather than manually. Since these steps are performed by the web server 102, there is less chance of confusion or mistake, and the speed of performance is also increased.

Although the present invention has been disclosed with the external devices 108, 110, and 112, one of ordinary skill in the art will understand that other devices may have access to the web server 102 to implement the business process without departing from the spirit and scope of the present invention.

Although the present invention has been disclosed with a digital camera with Digita™ Operating Environment, one of ordinary skill in the art will understand that other digital image capture devices with a programmability component may be used without departing from the spirit and scope of the present invention.

A method and system for data collection and workflow management in a business process has been disclosed. The present invention allows a business process to be created on a web server via the Internet, where the business process is then automatically implemented by the web server. The business process is stored in a database. The web server manages the data collection and workflow using the information stored in the database. The present invention includes the ability to integrate a digital image capture device into the business process, where the web server creates an executable file which is downloadable into the digital image capture device. The executable file creates tags for the digital images captured by the digital image capture device. The tags contain identifying information. The web server uses these tags to match an image to any corresponding data stored in the database. In this manner, there is less chance of confusion or mistake, and the speed of performance is also increased.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing a business process, comprising the steps of:
   (a) defining a plurality of steps of the business process on a network; and
   (b) automatically implementing the plurality of steps, wherein the plurality of steps comprises:
      (b1) sending a request for data, comprising:
         (b1i) determining that a digital image needs to be collected;
         (b1ii) creating an executable file to be executed by a digital image capture device for creating tags for the digital image to be captured by the digital image device; and
         (b1iii) sending the executable file to the digital image capture device;
      (b2) receiving the data with the tags, wherein the tags comprise identifying information concerning the data, and
      (b3) storing the data based on the tags.

2. A method for managing a business process, comprising the steps of:
   (a) defining a plurality of steps of the business process on a network; and
   (b) automatically implementing the plurality of steps, wherein the plurality of steps comprises:
      (b1) sending a request for data, comprising:
         (b1i) determining that a digital image needs to be collected;
         (b1ii) creating an executable file for a digital image capture device;
         (b1iii) sending the executable file to the digital image capture device;
         (b1iv) waiting to receive the digital image; and
         (b1v) sending a notification if the digital image is not received within a predetermine period of time;
      (b2) receiving the data with tags, wherein the tags comprise identifying information concerning the data; and
      (b3) storing the data based on the tags.

3. The method of claim 2, wherein the sending step (b1iii) further comprises:
   (b1iiiA) capturing the digital image utilizing the digital image capture device; and
   (b1iiiB) automatically creating the tags for the digital image in response to the digital image being captured, as directed by the executable file;
   (b1iiiC) uploading the digital image and the tags to the network.

4. The method of claim 1, wherein the storing step (b3) comprises:
   (b3i) matching the data to a plurality of database fields according to the tags; and
   (b3ii) storing the data in the matching plurality of database fields.

5. The method of claim 1, wherein the automatically implementing step (b) further comprises:
(b4) setting up a plurality of database fields based on the plurality of steps.

6. The method of claim 5, wherein the automatically implementing step (b) further comprises:
(b5) processing the data in the plurality of database fields according to the plurality of steps.

7. A method for managing a business process, comprising the steps of:
(a) defining a plurality of tags of the business process on a network; and
(b) automatically implementing the plurality of steps, wherein the plurality of steps comprises:
(b1) sending a request for data,
(b2) receiving the data with tags, wherein the tags comprise identifying information concerning the data,
(b3) storing the data based on the tags,
(b4) setting up a plurality of database fields based on the plurality of tags,
(b5) processing the data in the plurality of database fields according to the plurality of steps, and
(b6) sending a formatted data package to a remote server.

8. A method for managing a business process, comprising the steps of:
(a) defining a plurality of steps of the business process on a network; and
(b) automatically implementing the plurality of steps, wherein the plurality of steps comprises;
(b1) setting up a plurality of database fields based on the plurality of steps,
(b2) determining that the data needs to be collected,
(b3) sending a request for the data, comprising:
(b3i) creating an executable file for a digital image capture device,
(b3ii) sending the executable file to the digital image capture device,
(b3iii) waiting to receive a digital image, and
(b3iv) sending a notification if the digital image is not received within a predetermined period of time,
(b4) receiving the data with tags, wherein the tags comprise identifying information concerning the data,
(b5) matching the data to the plurality of database fields according to the tags, and
(b6) storing the tags in the matching plurality of database fields.

9. A method for managing a business process, comprising the steps of:
(a) defining a plurality of steps of the business process on a network; and
(b) automatically implementing the plurality of steps, wherein the plurality of steps comprises:
(b1) setting up a plurality of database fields based on the plurality of steps,
(b2) determining that data needs to be collected,
(b3) sending a request for the data,
(b4) receiving the data with tags, wherein the tags comprise identifying information concerning the data,
(b5) matching the data to the plurality of database fields according to the tags,
(b6) storing the tags in the matching plurality of database fields,
(b7) processing the data in the plurality of database fields according to the plurality of steps, and
(b8) sending a formatted data package to a remote server.

10. A method for managing a business process, comprising the steps of:
(a) defining a plurality of steps of a business process on a network; and
(b) automatically implementing the plurality of steps, wherein the plurality of steps comprises:
(b1) setting up a plurality of database fields based on the plurality of steps,
(b2) determining that a digital image needs to be collected,
(b3) creating an executable file to be executed by a digital image capture device for creating tags for the digital image to be captured by the digital image capture device,
(b4) sending the executable file to the digital image capture device,
(b5) receiving the digital image from the digital image capture device with the tags, wherein the tags comprise identifying information concerning the digital image,
(b6) matching the digital image to the plurality of database fields according to the tags, and
(b7) storing the tags in the matching plurality of database fields.

11. A system for managing a business process, comprising:
a web server, the web server comprising:
a plurality of web pages, wherein the plurality of web pages are utilized for defining a plurality of steps in a business process,
a database for storing the plurality of steps,
a process application for directing an implementation of the plurality of steps, an image capture device programming component for creating an executable file capable of being run by the programmability component for the digital image capture device,
an image server for storing and maintaining digital images;
an image processor for processing digital images and
an email server for sending emails to appropriate parties; and
a digital image capture device capable of communicating with the web server, the digital image capture device comprising a programmability component for implementing one of the plurality of steps.

12. The system of claim 11, wherein the digital image capture device further comprises a file tagging component for creating tags containing identifying information for a digital image according to the executable file.

13. The system of claim 12, wherein the digital image capture device further comprises a capture component for capturing a digital image.

14. A system for managing a business process, comprising:
a web server, the web server comprising:
a plurality of web pages, wherein the plurality of web pages are utilized for defining a plurality of steps in a business process,
a database for storing the plurality of steps,
a process application for directing an implementation of the plurality of steps, and
an image capture device programming component for creating an executable file to be executed by a digital image capture device for creating tags for the digital image to be captured by the digital image capturing device; and the digital image capture device capable of communicating with the web server, the digital image capture device comprising:
a programmability component for implementing the executable file, and a file tagging component for creating the tags containing identifying information for the digital image according to the executable file, wherein the digital image and the tags may be uploaded to the web server.

15. A computer readable medium with program instructions for managing a business process, the instructions for:
(a) defining a plurality of steps of a business process on a network; and
(b) automatically implementing the plurality of steps, wherein the plurality of steps comprises instructions for:
  (b1) sending a request for data, comprising:
    (b1i) determining that a digital image needs to be collected;
    (b1ii) creating an executable file to be executed by a digital image capture device for creating tags for the digital image to be captured by the digital image capture device; and
    (b1iii) sending the executable file to the digital image capture device;
  (b2) receiving the data with the tags, wherein the tags comprise identifying information concerning the data, and
  (b3) storing the data based on the tags.

* * * * *